T. E. CONNELLY.
Fire-Extinguisher.
No. 200,699. Patented Feb. 26, 1878.
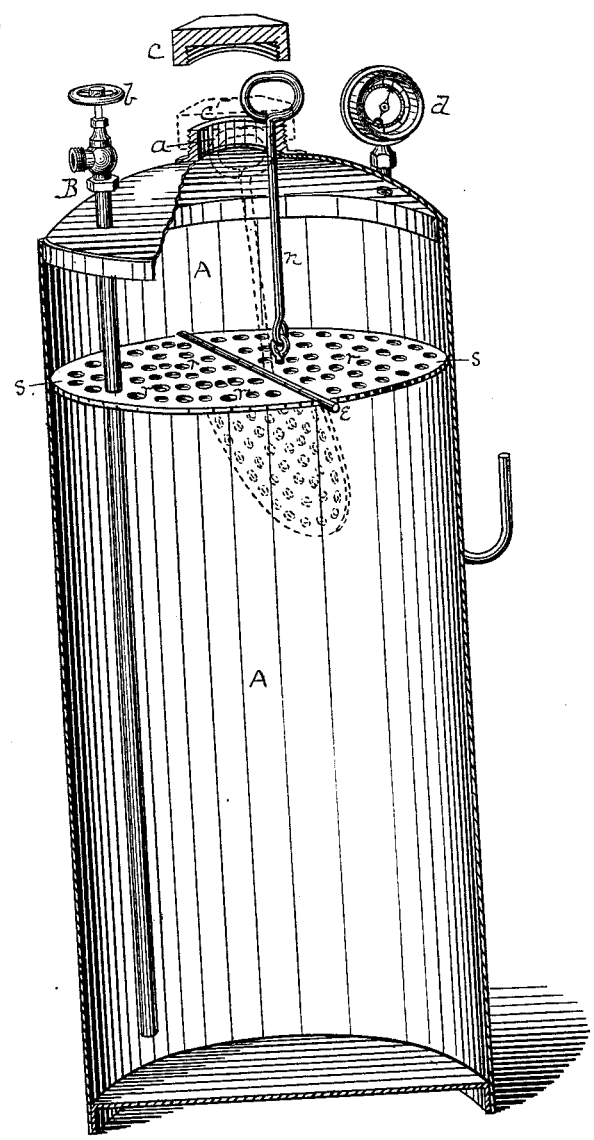

UNITED STATES PATENT OFFICE.

THOMAS E. CONNELLY, OF NEW BRIGHTON, PENNSYLVANIA.

IMPROVEMENT IN FIRE-EXTINGUISHERS.

Specification forming part of Letters Patent No. 200,699, dated February 26, 1878; application filed December 31, 1877.

*To all whom it may concern:*

Be it known that I, THOMAS EDWARD CONNELLY, of New Brighton, county of Beaver, State of Pennsylvania, have invented or discovered a new and useful Improvement in Fire-Extinguishers; and I do hereby declare the following to be a full, clear, concise, and exact description thereof, reference being had to the accompanying drawing, making a part of this specification, which represents a perspective view, partly in section, of my improved apparatus.

My improvement relates to that class of fire-extinguishers in which mingled carbonic-acid gas and water are used, the gas being generated under pressure within the apparatus.

My improvement is particularly designed for use when granulated bicarbonate of soda, porous sulphate of alumina, and water are employed for generating the gas and producing the required mixture, the use of such ingredients being fully described and claimed in Letters Patent granted to J. H. Connelly October 30, 1877, No. 196,562. Other ingredients may be employed, however, one or more of which are non-liquid in form.

When the chemical compounds mentioned are employed, gas is generated so promptly and rapidly that, unless the charging-port be closed at or very near the same moment at which the several ingredients are brought together, it cannot be closed at all, or, in any case, only with considerable difficulty; and, again, it is very desirable that the apparatus be constructed with as few openings as possible to the receiving-chamber, as it is difficult to pack such openings securely so as to prevent leakage.

In the drawing, A represents a cylindrical receiver or chamber. An eduction or discharge pipe is shown at B, having a stop-cock, $b$, to regulate the discharge. A charging-port, of any desired size, is shown at $a$. This port is effectually sealed or closed, when desired, by means of a screw-cap, $c$, which is fitted to the collar or neck $c'$ in any suitable way. A pressure-gage is shown at $d$. A diaphragm or plate, $s$, is suspended within the chamber A, transversely across the same, and, preferably, near the top or charging-opening $a$. This plate $s$ is pierced with a number of small holes, $r$, large enough to permit the passage of water, but not so large as to permit dry, powdered, or granulated substances—such as the ingredients above named—to pass in any considerable quantities. The purpose of these perforations $r$ may, however, be attained, especially in large-sized apparatus, by making the diaphragm or plate less in diameter than the receiver or chamber, leaving sufficient space between the two for the free passage of water.

I prefer to make a hinge-connection, $e$, between the diaphragm or plate and the wall of the chamber or other convenient support. A rod, $n$, connects with the plate or diaphragm either by a joint-connection, as shown, or otherwise, and extends out through the charging-port $a$. The diaphragm or plate may then be moved upon its hinge $e$, as shown in dotted lines.

I do not limit myself, however, to this form of diaphragm or method of attachment, as other equivalent devices may be employed—as, for example, the plate or diaphragm may be freely suspended within the chamber by means of the rod $n$, and raised or lowered bodily, instead of tipped on a hinge.

In operation, I fill the receiver A with water to the desired extent, or nearly to the level of the diaphragm or plate. I then deposit on the diaphragm the desired charge of non-liquid compounds for generating gas.

When it is desired to mix the ingredients, the rod $n$, which suspends the plate or diaphragm, is released and pushed down, thus either tipping the plate and precipitating the charge into the water below, or submerging the entire diaphragm and its contents. At the moment this is done, the cap $c$ is screwed down upon the neck $c'$ as quickly as possible, and before sufficient pressure is generated within the chamber to render such operation difficult. When the desired mixture is obtained, the apparatus is used in the usual way.

Various modifications may be made in the device described, especially in the manner of operating the diaphragm or plate $s$ in heavy apparatus, without departing from the scope of my invention—as, for example, the rod $n$, which suspends and operates the diaphragm, may pass through a stuffing-box in some other part of the receiver, and be further secured as against leakage by a screw-cap on the outside; but I prefer the arrangement shown and described, both for cheapness of construction and because the number of openings through the receiver are reduced. Also, the diaphragm or plate may be made in other forms, and suspended or hinged in other ways, and still come within my invention.

I claim herein as my invention—

In combination with a generating-chamber, a diaphragm or receiving-plate, movable in whole or in part, and having an opening or openings through or past the same, and an operating rod or stem, constructed and arranged substantially as described.

In testimony whereof I have hereunto set my hand.

THOMAS EDWARD CONNELLY.

Witnesses:
  J. J. McCORMICK,
  CLAUDIUS L. PARKER.